Sept. 22, 1959 E. W. FLINT 2,905,934

TRANSLATOR

Filed April 4, 1956 2 Sheets-Sheet 1

INVENTOR
E. W. FLINT

BY [signature]

ATTORNEY

Sept. 22, 1959

E. W. FLINT

TRANSLATOR 2,905,934

Filed April 4, 1956

2 Sheets-Sheet 2

INVENTOR
E. W. FLINT

BY [signature]

ATTORNEY

United States Patent Office
2,905,934
Patented Sept. 22, 1959

2,905,934

TRANSLATOR

Erlon W. Flint, Mountain View, N.J., assignor to Bell Telephone Laboratories, Incorporated, New York, N.Y., a corporation of New York Application April 4, 1956, Serial No. 576,016

10 Claims. (Cl. 340—347)

This invention relates to a ferromagnetic translator and more specifically to a translator utilizing rectangular hysteresis loop cores as switching elements.

A translator is a device which is employed to transfer information carried in one coding system to other coding systems encompassing different numbering bases and signaling methods. Broadly, a translator is a device, which, responsive to an inquiry in the form of electrically coded numbers, supplies an answer in the form of an output code. In the course of the functioning of communication systems or devices, it may be necessary to perform one or more conversions or translations of the input information. The susceptibility to erroneous translation of the information increases in direct proportion to the frequency with which the information is operated upon from a translation viewpoint.

In many communication devices including computing devices or data transmission systems, the necessity of accuracy in information handling is paramount. For this reason it is essential that the translation process be governed in such a manner that erroneous translations are detected and/or impeded.

It is therefore an object of this invention to provide an inherently self-checking arrangement in translating from one code base to another.

A further object of this invention is translation from a three-out-of-five code to a decimal system.

A feature of this invention is the use of only five cores in translating from a three-out-of-five code to a decimal code.

Another feature of this invention is the use of electrical bias potentials generated within the cores to impede erroneous translations.

These and other objects and features may be accomplished by a circuit including five rectangular hysteresis loop cores as switching elements. The five cores are each wound with four individual translation windings, an input winding, an input bias winding, two output bias windings and an advance winding. The translator is adapted to accept a digit in the three-out-of-five code, translate it to the two-out-of-five code, and finally convert to a one-in-ten code.

Translation is effected by the application of current to the input bias windings in a direction adapted to change the magnetic state of all of the five cores. Simultaneously, and for an equal duration or longer, currents are applied to three of the input windings corresponding to the three-out-of-five code for the digit to be translated. These input winding currents are in a direction to prevent a change of magnetic state in the cores to which they are applied. Consequently, three of the magnetic cores are not changed in state, or "set," but the remaining two are. The windings of the cores and the configuration of the circuit are arranged to permit the two energized cores to represent the same decimal digit as the three-out-of-five input code, e.g., 0, 1 and 2 are the three-out-of-five code representation for a decimal digit 0, while 4 and 7 are the corresponding two-out-of-five code designations.

Subsequently, current is applied to the advance winding to restore to the original state, or "reset," those cores which were previously set. In so doing, voltages will be induced which will produce an output indication from one of the decimal translation windings if two, and only two, cores were previously set. If more than two or less than two cores were previously changed in state, no output indication is made. In the latter two instances, voltages induced in the output bias windings serve to oppose those of the decimal translation windings and prevent any output therefrom.

The "set" and "reset" states, as explained above, are both stable conditions, and the cores herein employed remain for an indefinite period in the state to which they are driven.

The above objects and features of the invention will be more readily understood by reference to the accompanying description, appended claims and drawings in which:

Figure 4:
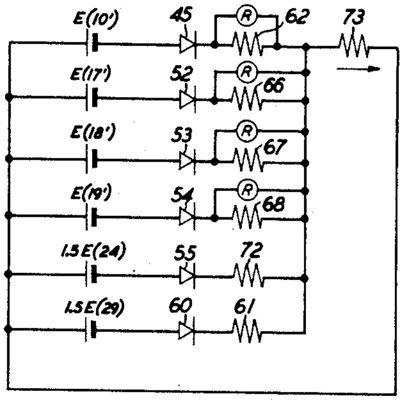
Fig. 4 is the electrical equivalent circuit of Fig. 2 when one input element or conductor is energized.
Figure 5:
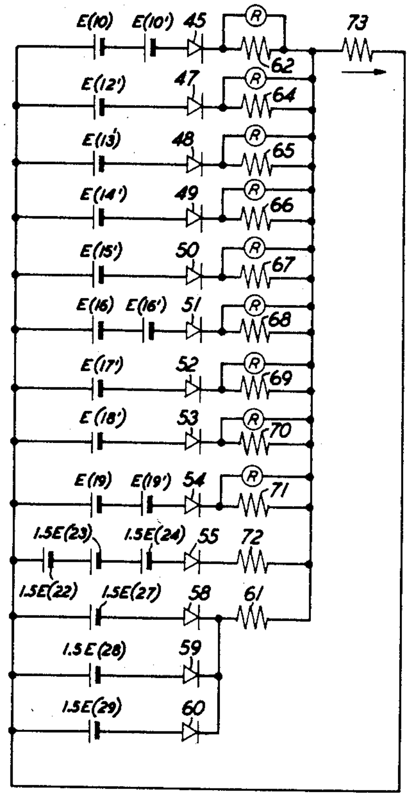
Fig. 5 shows the electrical equivalent of the circuit of Fig. 2 when three input conductors or elements are energized.
Figure 3:
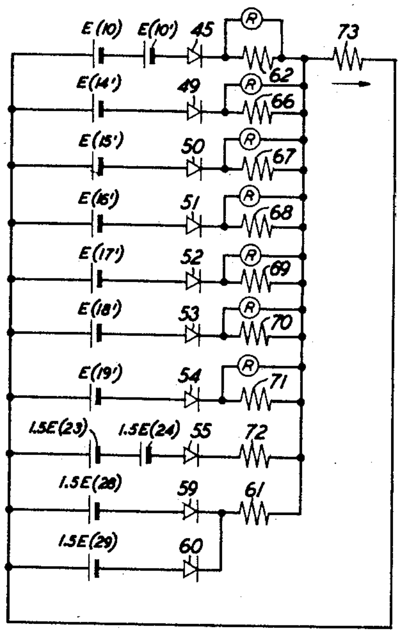
Fig. 3 is the electrical equivalent of the circuit of Fig. 2 when two input conductors or elements are energized, constituting the normal condition.

It will be noted that in Figs. 3, 4 and 5 the smaller, heavier line in the battery symbol is taken to represent the positive terminal of the battery.

Figure 1:
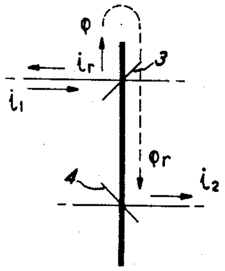
Fig. 1 is a diagram illustrating the relationship of current and flux flow in a circuit employing magnetic core mirror symbols such as are used in Fig. 2.
Figure 2:
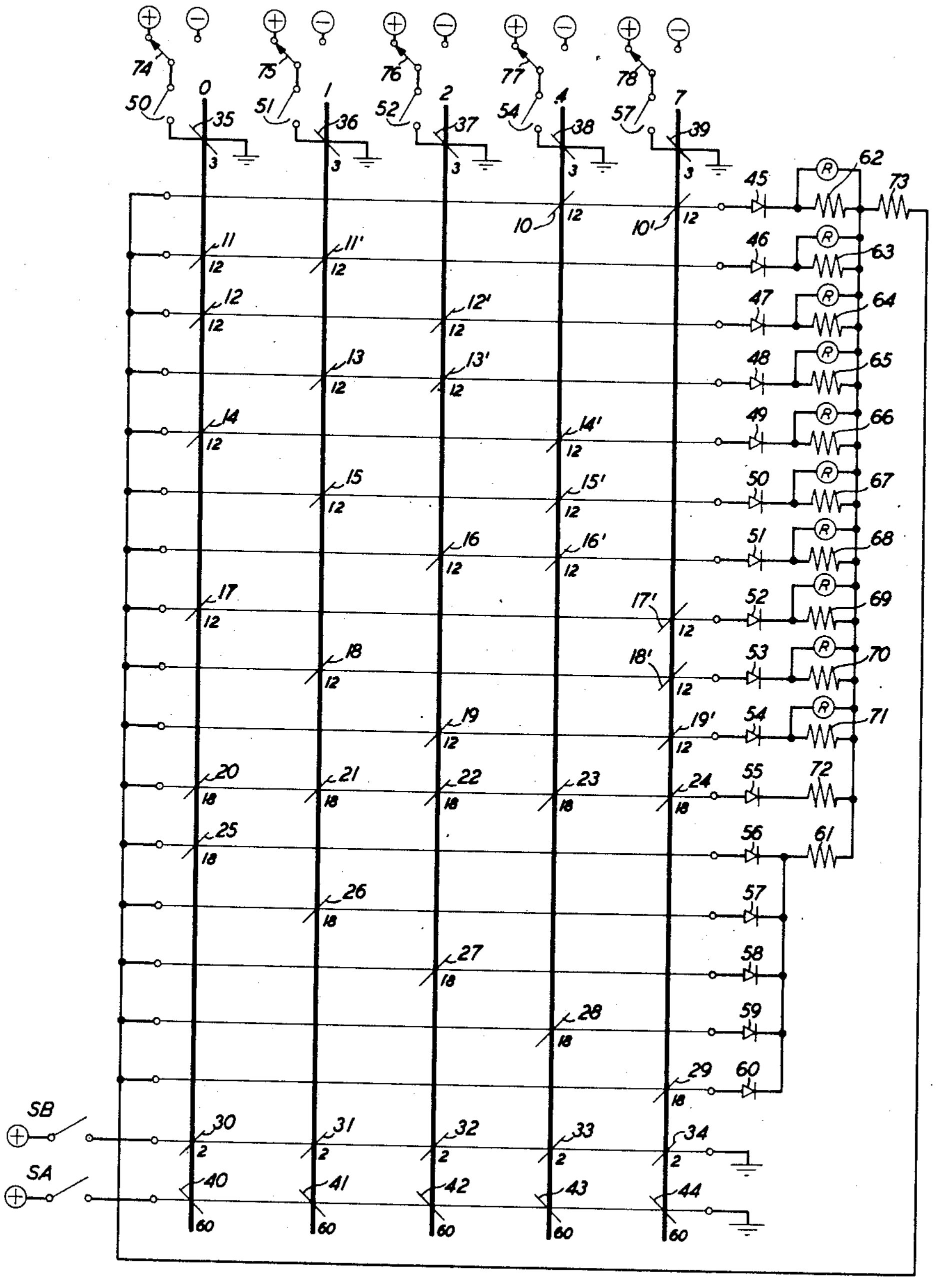
Fig. 2 shows a circuit embodying the invention in conjunction with a three-out-of-five to decimal translator in which five magnetic cores, each incorporating nine separate windings, are employed.

Referring now to Fig. 1, a diagram is shown indicating the polarities of applied and induced currents in the windings of a coil determinable from the "mirror" symbols utilized in Fig. 2. The "mirror" symbol method of representation offers a convenient means of determining the polarity of induced voltages, or the direction of current flow in secondary windings on a core. Cores and conductors are represented by line segments crossing at right angles. A winding is represented by a "mirror" passing through the intersection at an angle of 45 degrees. Winding polarity is indicated by the slope of the "mirror." The convention has been adopted that the current approaching the core is reflected off the "mirror" to generate a resulting flux. If reflected in an upward direction, it is considered to aid setting of the core, if downward, the flux tends to reset the core.

In Fig. 1, it may be seen that the direction of the induced flux $\varphi$ is in the upward direction since the input current $i_1$ is reflected by the "mirror" in an upwardly direction. The induced flux is traced to the end of the core and reflected back as shown for $\varphi_r$. Tracing the reflected flux $\varphi_r$ back down the core and reflecting off each "mirror," the direction of current flow in the windings is established. It may be seen that the induced current $i_r$ flows in the input winding 3 in a direction opposite to the input current $i_1$. This clearly conforms with Lenz's law. The current $i_2$ in the secondary winding is in the direction shown since the return flux $\varphi_r$ is reflected off the output winding 4, to the right.

For a further exposition of this type of notation, reference may be made to an article entitled "Pulse Switching Circuits Using Magnetic Cores," by M. Karnaugh, Proceedings of the I.R.E., vol. 43, number 5, p. 572, May 1955, and "A Proposed Symbol for Magnetic Circuits," by R. P. Mayer, Engineering Note E-472, Digital Computer Laboratory, Mass. Inst. of Tech., August 14, 1952.

In Fig. 2, five cores 0, 1, 2, 4 and 7 are represented by vertical lines. Ten pairs of decimal translation windings 10, 10'—19, 19' are selectively wound on the cores. Similarly, output bias windings 20—29 and input bias wingings 30—34 are wound through the cores. Separate input windings 35—39 are wound on each of the five cores, and finally, series connected advance windings 40—44 are wound on the cores.

The number appearing in contiguity to the "mirror" slant notation in the lower right-hand corner thereof represents the number of turns on the associated winding. It will be noted that, by way of example, various windings have been allocated differing numbers of turns which have been found suitable for the satisfactory operation of the particular embodiment illustrated.

A plurality of unilateral conducting elements or diodes 45—60 are located on the output of each of the decimal translation windings and the output bias windings. All of the output bias windings 25—29 are paralleled to a common bias resistance 61. The decimal translation windings 10, 10'—19, 19' are individually associated with respective bias resistances 62—71. All of the decimal translation and bias windings are ultimately commoned into a single bias resistance 73.

An electroresponsive device R is in parallel with each of the resistances 62—71 associated with the decimal translation windings 10, 10'—19, 19'. The devices are shown in symbolic form in Figs. 2, 3, 4 and 5 and it is understood that any electroresponsive device including galvanometers, marginal relays or other indicating devices capable of discriminating between a very light flow of current and a substantial current and rendering an indication in the latter condition only, may be used.

In this respect it may be observed that in lieu of the resistances 62—71 associated with the decimal translation windings 19—19', a group of rectangular hysteresis loop cores similar to those utilized for cores 0, 1, 2, 4 and 7 may be employed. These cores have the inherent property of acting as switching devices which are transposed in state or "set" only by a substantial current flow and do not change state when subjected to a very light current flow.

Having described the structure constituting this embodiment of the invention, the operation is as follows:

Assuming that the cores are originally in the reset state, translation is accomplished by applying pulses to three of the input windings 35—39 and to the series connected input bias windings 30—34 at the same time.

Assuming, for example, that the input windings 35, 36 and 37 of cores 0, 1 and 2 are energized by momentarily closing switches 50, 51 and 52 and the input bias windings 30—34 are simultaneously energized by closing switch SB, cores 4 and 7 will be set. This result follows since the flux occasioned by the flow of current (from left to right) in the input bias windings 30—34 is reflected in an upward direction tending to set all the cores. This flux is opposed by downward fluxes produced in cores 0, 1 and 2 by current flow through input windings 35, 36 and 37. In consequence, the upward fluxes, due to the input bias windings 33 and 34 on cores 4 and 7, set these cores.

Subsequently, switch SA is closed momentarily, applying a current pulse to windings 40—44. This current is reflected in a direction to produce downward fluxes tending to reset all the cores. Those cores which were previously set, i.e., cores 4 and 7, are now reset, undergoing substantial internal flux changes. If the fluxes on cores 4 and 7 are traced to the end of the cores and then back up as explained in Fig. 1, it will be seen that certain useful voltages are induced in the windings on these cores.

In core 4, for example, the upward return flux is reflected by advance winding 43 to the left, indicating opposition to the flow of current in said winding in accordance with Lenz's law. Of the remaining windings on core 4, windings 33, 28, 23, 16', 15', 14' and 10 reflect to the right, winding 38 reflecting to the left.

Current will not flow through winding 33, although voltages are induced therein since switch SB was only momentarily closed and is now in the open position. By the same token no current will flow in winding 38, although voltage is induced therein since switch 54 was only momentarily closed. The diodes associated with windings 28, 23, 16', 15' and 14' are poled in a direction to permit the induced current to flow, but as will be pointed out with reference to Fig. 3, these currents will be substantially blocked by an opposing voltage on the cathode side of their associated respective diodes 59, 55, 51, 50 and 49. It may be seen that current will flow in winding 10 as will be verified in the discussion of Fig. 3.

If a similar analysis is made of the other core reset, i.e., core 7, it will be observed that winding 10' which is connected in series with winding 10 of core 4, will likewise conduct current, said current flowing through the associated diode 45, resistance 62 and resistance 73, to return over an obvious path. As a result, electroresponsive device R associated with resistance 62 is actuated by the potential drop thereacross.

Thus it has been seen that for the assumed input on windings 35, 36 and 37 representing 0, 1, 2 in the three-out-of-five code, a translation has been effected to the representation 4 and 7 in the two-out-of-five code by the setting of cores 4 and 7, and subsequently to the decimal value zero in the base 10 code through the energization of electroresponsive indicating device R connected across resistance 62.

Similarly, the devices R connected across resistances 63—71 represent the decimal values 1–9, respectively.

Various other input combinations on the input windings will result in translation to other decimal representations as shown in the following table:

| Input, three-out-of-five | Two-out-of-five | Output decimal |
|---|---|---|
| 0, 1, 2 | 4, 7 | 0 |
| 2, 4, 7 | 0, 1 | 1 |
| 1, 4, 7 | 0, 2 | 2 |
| 0, 4, 7 | 1, 2 | 3 |
| 1, 2, 7 | 0, 4 | 4 |
| 0, 2, 7 | 1, 4 | 5 |
| 0, 1, 7 | 2, 4 | 6 |
| 1, 2, 4 | 0, 7 | 7 |
| 0, 2, 4 | 1, 7 | 8 |
| 0, 1, 4 | 2, 7 | 9 |

In the previous illustration, translation from the three-out-of-five code to the one-in-ten code wherein the correct number of elements, namely three, have been energized, has been described. Fig. 3 is the electrical equivalent of the circuit of Fig. 2 when three elements are energized to constitute the normal condition. In Fig. 3, the voltage induced in the windings of Fig. 2 is indicated by batteries which are labeled in multiples of E, where E is the voltage induced in a winding in Fig. 2 of twelve turns. Thus it may be seen that the resetting of cores 4 and 7 in Fig. 2 occasions the induced voltages in Fig. 3 as shown. Windings 10 and 10', for example, each having twelve turns contribute a total of 2E in series with diode 45, and resistance 62. Winding 14', having twelve turns thereon, produces a voltage of E through diode 49 and impedance 66. Similarly, windings 15', 16', 17', 18' and 19' each produces a voltage of E through their respective diodes and resistances or indicating devices. Output bias windings 23 and 24, each having 18 turns, contribute a voltage of 3E in series with diode 55 and resistance 72. The two remaining energized windings 28 and 29 each contributes a voltage of 1½E in parallel with their associated resistance 61.

Assuming for the purposes of the embodiment of Fig. 2 that resistances 61—72 are each 6.81 ohms and that resistance 73 is 4.64 ohms, analysis of the equivalent circuit of Fig. 3 indicates that the decimal translation windings 14', 15', 16', 17', 18' and 19' have no current flowing therethrough since their associated diodes 49—54 will be cut off by a voltage higher than E applied to their anode sides. In this case, bias windings 23, 24, 28 and 29 produce sufficient current through their associated resistances 72 and 61 to back bias diodes 49—54. Diode 45, however, will be in the conducting condition since a voltage of 2E is applied to the anode electrode of diode 45 and a lesser voltage is applied to the cathode. As a result, current will flow through resistance 62 and the associated electroresponsive device R to indicate a decimal translation of 0 from the three-out-of-five input code 0, 1, 2.

Fig. 4 is the electrical equivalent of the circuit of Fig. 2 when four input windings have been energized, resulting in the setting of only one core, an invalid input combination. Assuming that core 7 is the only core to set, reference to Figs. 2 and 4 indicate that the following conditions obtain:

A voltage of E is induced in windings 10', 17', 18', and 19'. Voltages of 1½E are induced in windings 24 and 29 as a result of the eighteen-turn windings thereon. Hypothesizing that the resistances in Fig. 4 are equal to those already cited for Fig. 2, an analysis of the circuit will indicate that a current flows in resistance 73 which will be sufficient to produce a drop of substantially .9E volt thereacross. This will reduce the current through any of the decimal translation windings 10', 17', 18' and 19' to a value insufficient to actuate their associated electroresponsive apparatus R. It will be further apparent to those skilled in the art that it is possible to cut off the flow from the decimal translation windings altogether.

In this illustration it has been assumed that core 7, and core 7 only, has been set, but it will be observed that if any other core had been set the equivalent circuit of Fig. 4 would nevertheless obtain. Similarly, although cores 4 and 7 have been assumed to be those cores that had been set in the discussion of Fig. 3, it will be noted that an identical electrical equivalent circuit would have been obtained had any other two pairs of cores been set.

In the event that more than two cores had set, indicating a lesser number of energized elements than the correct number; for example, if cores 2, 4 and 7 had been set as a result of the energization of input windings 35 and 36, the electrical circuit conditions of Fig. 5 would obtain.

Examining Figs. 2 and 5 it is seen that a voltage of 2E in series is produced by windings 10 and 10', 16 and 16' and 19 and 19', and a voltage of E is induced in windings 12', 13', 14', 15' 17' and 18'. A voltage of 4½E in series is produced by the bias windings 22, 23 and 24, and finally a voltage of 1½E is each produced by windings 27, 28 and 29.

Analysis of the circuit, assuming the same circuit parameters as previously given, indicates that the path through resistance 72 and diode 55 which has 4½E in series therewith predominates over all other induced voltages, causing a current flow through resistance 73 sufficient to cut off all other paths.

Thus it has been shown that the decimal translation windings 10, 10'—19, 19' will have a current flow therethrough of a substantial degree, sufficient to operate the indicating devices R associated therewith only in the event that two cores have been set, indicating an input code of three-out-of-five. If more than three or less than three input windings are activated, indicating an incorrect number of input elements, no output is produced, inasmuch as no associated indicating device R is activated. Thus far situations have been examined in which one core, two cores and three cores have been set. If more than three cores, for example, four or five cores, are set, the circuit is similar to that of Fig. 5, with the exception that the blocking action produced by the bias windings 20—24 is even more positive, producing bias voltages of 6E and 7½E, respectively, which are more than sufficient to cut off all of the other diodes in the circuit.

In this respect it may be observed that the arbitrary induced voltage E produced at the time that the cores are reset need not necessarily be the same when different numbers of cores are set and reset. Nevertheless the ratios of the voltages induced in the various windings of a particular core remain the same since the turns ratio bears a fixed relationship in the circuit.

It may be seen that the embodiment depicted in Fig. 2 may be used as a two-out-of-five to one-in-ten code translator by the application of the input signals to the selected two of the input windings 35—39 in a direction opposite to that shown to set the assocated cores. Under these conditions two of the switches 74—78 are shifted to negative battery and no signal is applied to the input bias windings. The remaining operation is identical with that described above.

It is understood that the embodiments shown are merely exemplary and that various modifications will be apparent to those skilled in the art without departing from the scope of the present invention.

What is claimed is:

1. A ferromagnetic translator comprising a plurality of rectangular hysteresis loop cores, a plurality of translation windings and output bias windings on each of said cores, said translation windings and output bias windings being wound according to a code, an input winding on each of said cores adapted to receive a signal characterizing the information to be translated, an input bias winding on each of said cores adapted when energized to change the magnetic state of any core on which the input winding is not simultaneously energized, an advance winding on each of said cores adapted when energized to restore any core in which the magnetic state has been changed to its original magnetic state, a plurality of diodes connected to said translation windings and said output bias windings, means for simultaneously energizing said input bias windings and a predetermined number of said input windings to set a predetermined number of cores, and means for thereafter energizing said advance winding to reset said cores thereby inducing currents in the translation windings thereon, said diodes being operative in response to opposing potentials induced in said output bias windings to impede the flow of current in said translation windings when the number of cores set is other than the predetermined number.

2. A ferromagnetic translator comprising a plurality of rectangular hysteresis loop cores, a plurality of translation and output bias windings on each of said cores, said translation windings being wound to express the value of a digit according to a code, an input winding on each of said cores adapted to receive a signal characterizing the information to be translated, an input bias winding on each of said cores adapted when energized to change the magnetic state of any core on which the input winding is not simultaneously energized, an advance winding on each of said cores adapted when energized to restore any core in which the magnetic state has been changed to its original magnetic state; a plurality of diodes connected to said translation windings and said output bias windings, means for simultaneously energizing said input bias windings and a predetermined number of said input windings to set a predetermined number of cores, and means for thereafter energizing said advance winding to reset said predetermined number of cores inducing current in the translation windings thereon, said diodes being operative, in response to opposing potentials induced in said output bias windings when the number of cores energized is other than the predetermined number, to impede the flow of induced currents in said translation windings.

3. A ferromagnetic three-out-of-five to decimal translator comprising a plurality of rectangular hysteresis loop cores, a plurality of decimal translation windings on each of said cores, said translation windings being wound according to a code, an input winding and an input bias winding on each of said cores, means for simultaneously energizing all of said input bias windings and a predetermined number of said input windings thereby setting any core in which the input winding is not energized, an advance winding on each of said cores adapted when energized to reset all of said cores, output bias windings on each of said cores, a plurality of diodes connected to one end of said decimal translation windings and said output bias windings, a common impedance joining said diodes to the other end of said decimal translation windings and output bias windings to form a closed electrical circuit, and means for detecting signals in said decimal translation windings to identify the decimal translation of a particular input code applied to said input windings, said means being operable in response to opposing potentials induced in said output bias windings to impede the flow of induced currents in said translation windings when the number of input windings energized is other than the predetermined number.

4. A ferromagnetic three-out-of-five to decimal translator comprising a plurality of hysteresis loop cores, four decimal translation windings wound on each of said cores according to a code, a plurality of output bias windings on each of said cores adapted when energized to oppose the potentials induced in said decimal translation windings, an input winding and an input bias winding on each of said cores, means for simultaneously energizing all of said input bias windings and three of said input windings thereby setting the two cores in which the input windings remain unenergized, an advance winding on each of said cores adapted when energized to restore the magnetic state of any core that has previously been set thereby inducing currents in the decimal translation windings thereon, means for detecting induced currents in said translation windings thereby effecting translation to a decimal code, a plurality of diodes connected to one end of said decimal translation windings and said output bias windings, a plurality of impedances connected in series with said diodes, means interconnecting said plurality of impedances, and a common impedance joining said plurality of impedances to the other end of said decimal translation and output bias windings to form a closed electrical path, diodes being operative in response to opposing potentials induced in said output bias windings to impede the flow of current in said decimal translation windings when the number of cores set is other than two.

5. A ferromagnetic three-out-of-five to decimal translator comprising five rectangular hysteresis loop cores, four decimal translation windings wound on each of said cores according to a code, two output bias windings on each of said cores adapted when energized to oppose the potentials induced in said decimal translation windings, an input winding and an input bias winding on each of said cores, means for simultaneously energizing all of said input bias windings and three of said input windings thereby setting the two cores in which the input windings remain unenergized, an advance winding on each of said cores adapted when energized to restore the previous magnetic state of any core that has previously been set, a plurality of diodes connected to one end of said decimal translation windings and said output bias windings, a plurality of impedances connected in series with said diodes, means interconnecting said plurality of impedances, a common impedance joining said plurality of impedances to the other end of said decimal translation windings and output bias windings to form a closed electrical path, and current detecting means connected to said decimal translation windings to identify the decimal translation of a particular input code applied to said input windings, said diodes being operable in response to opposing potentials induced in said output bias windings to impede the flow of current in said decimal translation windings thereby to prevent an erroneous translation when the number of cores energized is other than two.

6. A ferromagnetic translator comprising a plurality of rectangular hysteresis loop cores, a plurality of translation and output bias windings on each of said cores, said translation windings and output bias windings being wound according to a code, an input winding on each of said cores adapted when energized to change the magnetic state of the core on which said input winding is wound, an advance winding on each of said core adapted when energized to restore any core in which the magnetic state has been changed from its original magnetic state, a plurality of diodes connected to said translation windings and said output bias windings, means for energizing a predetermined number of said input windings according to a code thereby to change the magnetic state of a predetermined number of cores, and means for thereafter energizing said advance winding to restore said predetermined number of cores thereby inducing currents in the translation windings thereon, said diodes being operative, in response to opposing potentials induced in said output bias windings when the number of cores energized is other than the predetermined number, to impede the flow of induced currents in said translation windings.

7. A ferromagnetic translator comprising a plurality of rectangular hysteresis loop cores, a plurality of translation windings and output bias windings on each of said cores, said translation windings and output bias windings being wound according to a code, an input winding on each of said cores adapted when energized to set the core on which said winding is situated, an advance winding on each of said cores adapted when energized to reset any core which was previously set, a plurality of diodes connected to said translation windings and said output bias windings, a plurality of impedances connected to said diodes, means for energizing a predetermined number of said input windings to set a predetermined number of cores, and means for thereafter energizing said advance winding to reset said cores thereby inducing currents in the translation windings thereon.

8. A ferromagnetic two-out-of-five to decimal translator comprising a plurality of rectangular hysteresis loop cores, a plurality of decimal translation windings on each of said cores wound according to a code, an input winding on each of said cores adapted when energized to set the core on which it is located, an advance winding on each of said cores adapted when energized to restore any core in which the magnetic state has been changed from its original magnetic state, a plurality of output bias windings on each of said cores, a plurality of diodes connected to one end of said decimal translation windings and said output bias windings, a plurality of impedances connected to said diodes, means interconnecting said plurality of impedances, a common impedance joining said plurality of impedances to the other end of said translation decimal windings and output bias windings to form a closed electrical circuit, means for energizing a predetermined number of said input windings, means for thereafter energizing said advance winding to induce currents in said decimal translation windings, and means for detecting signals in said decimal translation windings to identify the decimal translation of a particular input code applied to said input windings, said diodes being operative in response to opposing potentials induced in said output bias windings to impede the flow of induced currents in said translation windings when the number of cores energized is greater than the predetermined number.

9. A ferromagnetic two-out-of-five to decimal translator comprising a plurality of hysteresis loop cores, four decimal translation windings wound on each of said cores according to a code, a plurality of output bias windings on each of said cores adapted when energized to oppose the potentials induced in said decimal translation windings, an input winding on each of said cores adapted when energized to set the magnetic core on which it is located, an advance winding on each of said cores adapted when energized to reset said core, means for energizing two of said input windings, means for thereafter energizing said advance winding thereby inducing currents in a number of decimal translation windings, a plurality of diodes connected to one end of said decimal translation windings and said output bias windings, a plurality of impedances connected in series with said diodes, and a common impedance joining said plurality of impedances to the other end of said decimal translation and output bias windings to form a closed electrical path, said diodes being operative in response to opposing potentials induced in said output bias windings to impede the flow of current in said decimal translation windings when the number of cores set is other than two.

10. A ferromagnetic two-out-of-five to decimal translator comprising five rectangular hysteresis loop cores, four decimal translation windings wound on each of said cores according to a code, two output bias windings on each of said cores adapted when energized to oppose the potentials induced in said decimal translation windings, an input winding on each of said cores adapted when energized to change the state of the core on which said winding is situated, an advance winding on each of said cores adapted when energized to reset any core that has previously been set, means for energizing two of said input windings, means for thereafter energizing said advance winding thereby inducing currents in said decimal translation windings, a plurality of diodes connected to one end of said decimal translation windings and said output bias windings, a plurality of impedances connected in series with said diodes, means interconnecting said plurality of impedances, a common impedance joining said plurality of impedances to the other end of said decimal translation windings and output bias windings to form a closed electrical path, and current detecting means connected to said decimal translation windings to identify the decimal translation of a particular input code applied to said input windings, said diodes being operable in response to opposing potentials induced in said output bias windings to impede the flow of current in said decimal translation windings to prevent an erroneous translation when the number of cores energized is other than two.

References Cited in the file of this patent

UNITED STATES PATENTS

| | | |
|---|---|---|
| 2,637,017 | Holden | Apr. 28, 1953 |
| 2,695,397 | Anderson | Nov. 23, 1954 |
| 2,734,182 | Rajchman | Feb. 7, 1956 |
| 2,768,367 | Rajchman | Oct. 23, 1956 |
| 2,817,079 | Young | Dec. 17, 1957 |